United States Patent Office 3,223,691

Patented Dec. 14, 1965

3,223,691

POLYMERIZATION PROCESS

Harry Greenberg and Virgil L. Hansley, Cincinnati, Ohio, assignors to National Distillers and Chemical Corporation, New York, N.Y., a corporation of Virginia No Drawing. Filed June 15, 1962, Ser. No. 202,713
The portion of the term of the patent subsequent to Dec. 4, 1979, has been disclaimed
7 Claims. (Cl. 260—93.5)

This application is a continuation-in-part of copending application, Serial No. 29,152, filed May 16, 1960, now U.S. Patent No. 3,067,187.

This invention relates to a process for the controlled polymerization of unsaturated organic compounds and, more particularly, to an improved process for the production of polymers and copolymers of unsaturated organic compounds, said polymers and copolymers having controlled molecular weights. Specifically, the invention provides an efficient and economical process for producing elastomers having controlled molecular weights by polymerizing or copolymerizing unsaturated organic compounds in the presence of an "alfin" catalyst and in the presence of a molecular weight moderator.

The polymerization of unsaturated organic compounds, e.g. ethylenically unsaturated compounds such as conjugated diolefins including butadiene, with or without comonomers, such as vinyl aromatics including styrene, in the presence of an "alfin" catalyst, as defined hereinafter, is known. The use of an alfin polymerization catalyst results in an unusually rapid rate of reaction and in good yields of polymer. In comparison with synthetic rubbers made by conventional catalytic polymerizing techniques, the alfin rubbers are generally gel-free and have higher flex-life values, high tensile strength, superior abrasion resistance and tear strength. Alfin rubbers, however, have the disadvantage of being characterized by extremely high molecular weights (in general over 2,000,000 and often over 5,000,000). Because of such high molecular weights, these rubbers are very tough and exhibit little breakdown and extremely poor banding on being milled. They are, therefore, very difficult to process using conventional equipment and conventional procedures, and attempts to mill and compound then result in very rough stocks with relatively high shrinkage and exceedingly high viscosities. Previous attempts to obtain an alfin rubber of lower molecular weight by regulating the polymerization have, to the best of our knowledge, proved unsuccessful, and so, until now, alfin rubbers have been commercially unattractive.

It is an object of this invention to provide a method for the controlled polymerization of unsaturated organic monomeric materials and mixtures of unsaturated organic monomeric materials with organic compounds copolymerizable therewith, using an alfin catalyst. It is a further object of this invention to provide a novel method for producing in good yields alfin rubbers having controlled molecular weights. Other objectives of the invention will become apparent from the detailed description set forth below.

A method has now been found whereby the polymerization and the molecular weight of alfin rubbers can be controlled. The present invention is based upon the discovery that an elastomer having controlled molecular weight can be prepared by polymerizing an unsaturated organic compound, such as butadiene, or a mixture of an unsaturated organic compound and an organic compound copolymerizable therewith, such as styrene, in the presence of an alfin catalyst and also in the presence of a suitable molecular weight moderator, as defined more fully hereinafter. The addition of controlled quantities of such a moderator to solutions of, for example, butadiene containing an alfin catalyst gives molecular weight control over a range of about 50,000 to about 1,250,000.

Polymerization or copolymerization in the presence of an alfin catalyst can be controlled, and thus a polymer with controlled molecular weight can be obtained, when certain conjugated monomers or, more specifically, certain dihydroderivatives of aromatic hydrocarbons are included in the polymer chain. These alfin-catalyzed polymerizations give final products having high elastomer content but low intrinsic viscosity, thus making continuous operation feasible.

The dihydro derivatives of aromatic hydrocarbons as embodied herein include 1,4-dihydrobenzene, 1,4-dihydronaphthalene, 1,2-dihydrobenzene, dihydrotoluene, dihydroxylene, and the like, and mixtures of these, with 1,4-dihydrobenzene and 1,4-dihydronaphthalene being preferred.

The amount of moderator required for a given molecular weight is dependent upon such factors as the temperature and pressure of the reaction and the quantity and type of diluents employed. In general, it may vary from about one to about eighty percent, based on the weight of the monomer, and the use of about 1.5 to about 6 percent is preferred.

Although the mechanism of the action of these moderators in molecular weight control is not yet fully understood, carbon-14 studies have shown that at least one molecule of the moderator is present for each polymer chain, the additional aromatic ring being present presumably as a terminal group. These moderators do not change the ratio of 1,4-trans to 1,2-isomers in the resultant polymers, the ratio in the range of 2 to 3 in normal alfin rubbers being retained.

In the practice of one embodiment of the present invention the reactor is dried, flushed, and blanketed with an inert gas such as nitrogen or argon, and a dry inert hydrocarbon solvent and the molecular weight moderator are introduced. The reactor is then cooled to about $-5°$ to about $-20°$ C., preferably to about $-10°$ C.; the flow of inert gas is diverted; and dry monomer or mixture of monomer and comonomer is condensed into the solvent. Alfin catalyst is then charged into the cold solvent-monomer mixture; the reactor is sealed and shaken vigorously. After about two hours the catalyst is destroyed with ethanol and the polymer is withdrawn. It is then washed with an alcohol, such as methanol or ethanol, to remove the solvent and with water to remove soluble inorganic salt residues; and dried.

In another embodiment of this invention all of the ingredients except the monomer, that is, the solvent, alfin catalyst, and the molecular weight moderator, are introduced into the reactor. A controlled flow of monomer is then fed into the system over a period of about five hours. This system results in greater utilization of the moderator than the former system, the extended time of reaction resulting in molecular weight control by less moderator due to the low moderator activity compared with the rate of polymerization.

Where removal of water-soluble residues is not desired, the catalyst can be neutralized, e.g., with acetic acid or hydrochloric acid, and the solvent removed by distillation while stirring. If desired, before solvent removal the polymer may be compounded with any or all of the conventional vulcanization additives, such as carbon, zinc oxide, stearic acid, an accelerator, and sulfur, so that the product obtained after distillation represents a completed formulation ready for vulcanization, thus bypassing the usual milling and mixing steps.

The process of this invention is particularly well adapted to the polymerization of butadiene itself, i.e., 1,3-butadiene, and to the copolymerization of 1,3-butadiene and styrene and will be particularly discussed with reference to these reactants. The process, however, is also applicable to the formation of polymers and copolymers of other unsaturated organic compounds. The monomeric material polymerized in accordance with the process of this invention may also be, for example, other butadienes, such as 2,3-dimethyl-1, -3-butadiene, isoprene, piperylene, 3-furyl-1,3-butadiene, 3-methoxy-1,3-butadiene, and the like; aryl olefins such as styrene, various alkyl styrenes, p-chlorostyrene, p-methoxystyrene, alpha-methylstyrene, vinyl-naphthalene, and similar derivatives, and the like; vinyl ether, vinylfurane, and other unsaturated hydrocarbons.

The process is effective also when a monomeric material such as listed above is copolymerized with one or more other compounds which are copolymerizable therewith, such as aryl olefins.

In addition to using as the monomer pure or rubber-grade butadiene, which contains about 99.6 weight per cent of butadiene, the polymerization process of this invention can be applied to impure or dilute butadiene, which contains about 12 to about 40 weight percent of butadiene. The composition of the polymer prepared from a lean butadiene stream, however, is the same as that prepared from pure butadiene, that is, about 30 percent of the 1,2 isomer and about 70 percent of the trans-1,4-isomer.

The polymerization or copolymerization of these reactants takes place in the presence of an alfin catalyst, that is, an intimate mixture of a sodium alkenyl compound, a sodium alkoxide, and an alkali metal halide, such as for example a mixture of sodium isopropoxide, allyl sodium, and sodium chloride. In general, the alfin catalyst is prepared by (1) reacting amyl chloride with sodium and subsequently (2) reacting the product of (1) with a methyl alkyl carbinol and an olefin. In a specific embodiment, the alfin catalyst is prepared by reacting amyl chloride and sodium in pentane or hexane with high-speed stirring. One mole of the resulting amyl sodium is then reacted with 0.5 mole or isopropyl alcohol and 0.5 mole of propylene to give a mixture containing sodium isopropoxide, allyl sodium, and sodium chloride. A particularly effective alfin catalyst is obtained when the sodium is employed as a finely divided dispersion, that is, a dispersion in which the maximum particle size is about 1 to 2 microns, such as may be prepared on a Gaulin mill. When such finely divided sodium is used, ordinary stirring devices may be employed instead of high-speed comminuting equipment. In addition, the use of finely divided sodium results in a 100 percent yield of amyl sodium and, therefore, in subsequent quantitative yields of sodium isopropoxide and allyl sodium. Thus the alfin catalyst and consequently the end products of the polymerization are free of metallic sodium contamination. Also catalyst activity can be more readily reproduced when finely divided sodium (about 2 microns maximum particle size) is used. When maintained under an inert atmosphere, e.g., nitrogen or argon, the alfin catalyst appears to be stable almost indefinitely.

The amount of catalyst should be about one to about five weight percent, based on the total sodium content, and preferably is about 1.8 to 2.2 weight percent.

The polymerization or copolymerization reaction generally takes place at atmospheric pressure and room temperature in a suitable selected reaction medium. The pressure and temperature conditions, however, are not critical, the reaction occurring at any pressure between about 1 atmosphere and about 50 atmospheres and at any temperature between about $-25°$ and $+40°$ C. The reaction medium is suitably an inert hydrocarbon, examples including pentane, hexane, a 1:1 mixture of hexane and pentane, cyclohexane, decalin, heptane, and the like, or mixtures thereof, with hexane and pentane being preferred. The rigorous exclusion of water from solvents, monomer, and apparatus is important.

The process may be conducted in a batchwise, semicontinuous, or continuous manner, and the polymers and copolymers so produced may be recovered by any of the conventional techniques.

The more detailed practice of the invention is illustrated by the following examples wherein parts are given by weight unless otherwise specified. These examples and embodiments are illustrative only, and the invention is not intended to be limited thereto except as indicated by the appended claims.

PREPARATION OF ALFIN CATALYST

The preparation of the Alfin catalyst employed in the examples was carried out as follows:

Dry hexane (660 parts) was charged to a 3-necked flask provided with stirrer, inert gas sweep, a Dry Ice reflux condenser system, and an external cooling bath. To this was added 132.4 parts of finely divided sodium (2 microns maximum particle size) (1.6 gram-atoms) dispersed in alkylate. The slurry was cooled to $-10°$ C., and 102 parts of dry n-amyl chloride (0.84 mole) was added slowly with moderate stirring which was continued for one hour after the addition had been completed. The 30.6 parts of isopropyl alcohol (0.4 mole) was added slowly. Stirring was then maintained for an additional 45 minutes. Excess dry propylene (C.P. grade) was subsequently introduced into the mixture, the temperature of which was maintained at $-10°$ C. until active reflux of the propylene ocurred. The temperature was then raised gradually to 25° C., and the mixture was stirred at this temperature for two hours. During the last 15 minutes the propylene was allowed to leave the system and was collected for recycle. The reaction slurry was transferred to a storage vessel maintained in an inert atmosphere of argon and was then diluted to 1120 parts with dry hexane. This slurry, that is, the alfin catalyst, contained 0.4 mole of sodium isopropoxide, 0.4 mole of allyl sodium, and 0.8 mole of sodium chloride.

DETERMINATION OF MOLECULAR WEIGHTS

Average molecular weights of the polymers were calculated from determined values of the intrinsic viscosities using the Staudinger equation $$M^a = n/k$$

wherein M is the average molecular weight, $n$ is the intrinsic viscosity, and $a$ and $k$ are constants determined for specific polymer types of known molecular weights. Intrinsic viscosities were determined by preparing 0.1 and 1.0 percent solutions of the polymer in a particular solvent, determining their viscosities at a particular temperature, and extrapolating the resultant curve to infinite dilution.

The solvent and temperature used in measuring intrinsic viscosity and the values for $a$ and $k$ for any particular polymer or copolymer were chosen from H. Mark and A. V. Tobolsky, "Physical Chemistry of High Polymeric Systems," 2nd edition, p. 290 (Interscience Publishers, New York, 1960). The specific conditions used are listed below:

| Polymer | Solvent | Temp., ° C. | $k \times 10^4$ | $a$ |
|---|---|---|---|---|
| Butadiene | Toluene | 25 | 11 | 0.62 |
| Butadiene-styrene (GR-S) | do | 30 | 5.25 | 0.667 |
| Styrene | do | 30 | 1.6 | 0.69 |
| Isoprene (Natural rubber) | do | 25 | 5.02 | 0.667 |

*Example 1*

To 100 parts of dry hexane was added 2.0 parts of 1,4-dihydrobenzene. 30 parts of dry butadiene (about 98 weight percent) was then dissolved in the hexane at about −10° C. Alfin catalyst (17.5 parts, containing 0.065 gram of solid per ml.) was added to the butadiene-hexane solution; the system was sealed and maintained at room temperature with intermittent shaking for about two hours. The system was then opened, and ethanol was added to destroy the catalyst and to precipitate the product. The product was then washed intermittently with ethanol and water containing antioxidant to remove soluble inorganic residues (such as sodium isopropoxide and sodium chloride). The resulting insoluble material was wet, white solid polybutadiene. It was given a final wash with acetone containing an antioxidant, n-phenyl, 2-naphthylamine, and then dried in an oven at 40° C. under vacuum. A 96 percent yield, based on the charged weight of butadiene, was obtained. The polymer had a molecular weight of 537,000 and an intrinsic viscosity of 3.9.

*Example 2*

Dry butadiene (about 98 weight percent) was metered at the rate of about 60 parts per hour into a stirred suspension of 210 parts of alfin catalyst and 10 parts of 1,4-dihydrobenzene in 300 parts of hexane. The reaction ran for six hours at room temperature. (The almost complete retention of butadiene was assured by the carbon dioxide-acetone cooled condenser included in the system which became operative if the feed of butadiene exceeded the rate of reaction.) After all of the butadiene had been aded, stirring was continued for two hours. The resulting polybutadiene was then treated with alcohol to destroy the catalyst and then with alcohol and water. It was then dried. The yield was 95 percent of a polymer having a molecular weight of 229,000 and an intrinsic viscosity of 2.3.

*Example 3*

The procedure of Example 1 was repeated except that 1,4-dihydrobenzene was omitted. After 15 minutes of reaction, a tough gelatinous semi-solid was obtained which was treated as above. The product had a molecular weight greater than 2,000,000 and was difficult to handle.

Examples of 4 to 7 are included to show the effect of varying amounts of molecular weight moderator. The procedure of Example 1 was repeated, and the results of these runs apear in Table I.

TABLE I

| Example | Hexane, cc. | 1,4-dihydrobenzene, grams | Butadiene, grams | Polymer yield, percent | Intrinsic viscosity | Molecular weight |
|---|---|---|---|---|---|---|
| 4 | 150 | 0.8 | 30.1 | 97.0 | 6.25 | 1,148,000 |
| 5 | 150 | 3.4 | 29.0 | 98.5 | 3.21 | 380,000 |
| 6 | 150 | 15.0 | 30.0 | 92.0 | 1.52 | 117,000 |
| 7 | 150 | 25.0 | 30.0 | 95.5 | 1.4 | 100,000 |

Examples 15 to 21 are included for purposes of comparison to show the ineffectiveness of numerous other substances as molecular weight modifiers. The procedure of Example 1 was followed.

TABLE II

| Example | Moderator | Moderator, grams per 30 gms. butadiene | Polymer yield, percent | Intrinsic viscosity | Molecular weight |
|---|---|---|---|---|---|
| 2 | None | | | | >2,000,000 |
| 8 | 1,4-dihydronaphthalene | 0.35 | 99.0 | 4.42 | 645,700 |
| 9 | 1,4-dihydronaphthalene | 0.7 | 100.0 | 2.35 | 229,000 |
| 10 | 1,4-dihydronaphthalene | 1.4 | 90.0 | 1.68 | 135,000 |
| 11 | 1,4-dihydronaphthalene | 3.3 | 69.0 | 1.19 | 77,620 |
| 12 | 1,2-dihydrobenzene | 3.6 | 89.0 | 7.0 | 1,260,000 |
| 13 | Dihydrotoluene | 4.5 | 97.0 | 6.53 | 1,202,000 |
| 14 | Dihydroxylene | 4.5 | 22.0 | 4.62 | 708,000 |
| 15 | Benzene | 10.0 | | | gel |
| 16 | Ethylene | 0.4 | | | gel |
| 17 | Octadiene | 5.0 | | | gel |
| 18 | Alpha-pinene | 5.0 | | | gel |
| 19 | Dipentene | 5.0 | | | gel |
| 20 | Propylene | 10.0 | | | gel |
| 21 | Butene-2 | 10.0 | | | gel |

As is evident from these data, polymerizing butadiene in the presence of a moderator as embodied in this invention results in polymers whose molecular weights can be controlled.

*Example 22*

Into a suspension of 105 parts of alfin catalyst in 660 parts of hexane containing 15 parts of 1,4-dihydrobenzene was passed, at the rate of about 30 parts per hour, a stream containing about 40 percent butadiene, 55 percent 1- and 2-butenes, and some propylene and ethylene. The reaction was continued for six hours, the polymer was worked up as in Example 2, and 62 parts of polymer having a molecular weight of 170,000 and an intrinsic viscosity of 2.0 were recovered.

*Example 23*

The procedure of Example 1 was repeated except that the solvent was cyclohexane instead of hexane. Comparable results were obtained.

The procedure of Example 1 was repeated except that a 70/30 weight mixture of butadiene and styrene was used instead of butadiene alone. The following results were obtained:

TABLE III

| Example | Moderator, parts | Butadiene, parts | Styrene, parts | Polymer yield, parts | Polymer yield, percent | Intrinsic viscosity | Molecular weight |
|---|---|---|---|---|---|---|---|
| 24 | 0 | 27.8 | 12.9 | 40 | 98.5 | gel | ---------- |
| 25 | 4.2 | 32.4 | 12.9 | 33.3 | 73.5 | 2.43 | 350,000 |
| 26 | 8.4 | 29.2 | 12.9 | 21.7 | 51.5 | 1.83 | 168,000 |

Each of a series of bottles was filled with 450 cc. of molecular-sieve dried hexane, 100 grams of monomer (styrene or styrene-butadiene), 90 cc. of alfin catalyst (2.4 moles of sodium per 3200 cc. of solution), and a specified amount of 1,4-dihydrobenzene. The bottles were capped and hand-shaken at room temperature for 10–15 minutes until polymerization was complete (heat of polymerization was noticeable). After two hours, the bottles were opened; the residual catalyst was killed with ethanol; the polymer was precipitated and washed with ethanol and then water in a Waring Blendor; and the polymer was then dried either under vacuum or on a rubber mill.

The results of these runs are tabulated below:

TABLE IV

| Example | 1,4-dihydro-benzene, cc. per 100 grams of monomer | Butadiene, grams | Styrene, grams | Polymer yield, percent | Intrinsic viscosity | Molecular weight |
|---|---|---|---|---|---|---|
| 27 | 0 | 15 | 85 | 80 | 0.83 | 242,100 |
| 28 | 3 | 15 | 85 | 80 | 0.63 | 162,400 |
| 29 | 6 | 15 | 85 | 80 | 0.61 | 155,000 |
| 30 | 12 | 15 | 85 | 80 | 0.57 | 140,000 |
| 31 | 0 | 10 | 90 | 88 | 0.58 | 144,000 |
| 32 | 3 | 10 | 90 | 82 | 0.48 | 109,000 |
| 33 | 6 | 10 | 90 | 65 | 0.43 | 93,300 |
| 34 | 12 | 10 | 90 | 64 | 0.43 | 93,300 |
| 35 | 0 | 0 | 100 | 96.8 | 1.56 | 604,200 |
| 36 | 3 | 0 | 100 | 97.5 | 0.67 | 428,000 |
| 37 | 6 | 0 | 100 | 93 | 0.59 | 383,700 |
| 38 | 12 | 0 | 100 | 97.6 | 0.40 | 84,000 |

*Example 39*

The procedure of Example 1 was repeated except that isoprene was used instead of butadiene. The following results were obtained, using 100 parts of dry hexane, 30 parts of isoprene, and 17.5 parts of alfin catalyst (0.0253 atom total sodium):

TABLE V

| Example | 1,4-dihydroben-zene, grams | Polymer yield, percent | Molecular weight |
|---|---|---|---|
| 39 | 1.02 | 94 | 151,400 |
| 40 | 0.65 | 91 | 199,000 |
| 41 | 0.51 | 96 | 229,000 |
| 42 | 0.33 | 92 | 239,000 |
| 43 | 0.25 | 93.5 | 426,000 |
| 44 | 0.12 | 81.5 | 436,000 |
| 45 | 0.00 | 95 | gel |

A series of polybutadienes prepared by the procedures of Examples 1 and 2 were analyzed for isomer content via infrared. In each case, the typical 1,4/1,2 ratio of between 2 and 3 was shown, indicating that the molecular weight modifiers of this invention do not substantially alter the microstructure of polybutadiene.

TABLE VI

| Example | Polymerization procedure | Ratio of 1,4/1,2 |
|---|---|---|
| 46 | Example 1 | 68% 1,4-trans-32% 1,2-isomers. |
| 47 | Example 2 | 73% 1,4-trans-27% 1,2-isomers. |

Polymers prepared by the modified polymerization techniques described herein have been milled, compounded, and vulcanized. Whereas high molecular weight products (1,000,000 and up) on milling become hard and tough, the polymers of this invention do not break down on milling, even after one hour, and preparations having molecular weights below about 400,000 can be easily milled in a few minutes to give pliable, tacky sheets. Very soft, pliable mixtures result in the mill when stearic acid, zinc oxide, a plasticizer, and carbon are incorporated into the polymer. These products cure with sulfur and an accelerator to elastic rubbers having tensile strengths of about 2800–4000 p.s.i.

*Example 48*

The following tread stock formulation was used for the polymers of this invention:

TABLE VII

| Ingredient: | Parts |
|---|---|
| Polybutadiene (prepared as in Example 1) | 100 |
| n-Phenyl,2-naphthylamine | 1 |
| Stearic acid | 3 |
| Zinc oxide | 5 |
| Sulfonated petroleum and mineral oil | 3 |
| Carbon black | 50 |
| Sulfur | 2 |
| Benzothiazyl disulfide | 1.5 |
| Thiuram disulfide | 0.15 |

*Example 49*

(A) 105 grams of dry hexane was charged to a pressure bottle; under a dry nitrogen atmosphere 30 grams of an isomeric mixture of methyl styrenes (ortho, meta, and para) and then 21 grams of alfin catalyst (containing 7.5 millimoles of sodium allyl) were added. The reaction was complete in about 2 hours. The resulting polymer was washed with ethanol and water to remove the solvent and catalyst residues and then dried to constant weight at room temperature under vacuum. 20 grams of a snow-white polymer was recovered. This polymer exhibited an intrinsic viscosity of 1.28, equivalent to a molecular weight of 470,000.

(B) The procedure of Example 49 (A) was repeated except that 4 cc. of 1,4-dihydrobenzene was included as a reaction ingredient. 21 grams of polymer was recovered, exhibiting an intrinsic viscosity of 1.18, equivalent to a molecular weight of 350,000.

Many modifications of this invention will be apparent to those skilled in the art upon study of the accompanying disclosure. Such modifications are believed to be within the spirit and scope of this invention.

What is claimed is:

1. In a process for preparing a polymer from a feed material consisting of an alkenylbenzene in the presence of an alfin catalyst consisting essentially of a sodium alkoxide, a sodium alkenyl compound, and an alkali metal halide, the improvement which comprises carrying out said polymerization in the presence of a dihydro aromatic hydrocarbon selected from the group consisting of 1,2 - dihydrobenzene, 1,4-dihydrobenzene, 1,4 - dihydronaphthalene, dihydrotoluene, and dihydroxylene to control the molecular weight of the polymer.

2. The process of claim 1 wherein the alfin catalyst, with respect to the amyl sodium intermediate component thereof, is prepared by the reaction of amyl chloride with finely-divided sodium dispersions having an average particle size of not more than about 2 microns.

3. The process of claim 1 wherein the alkenylbenzene is styrene.

4. The process of claim 1 wherein the alkenylbenzene is a substituted styrene.

5. The improvement of claim 1 wherein about one to eighty weight percent, based on the alkenylbenzene, of the dihydroaromatic hydrocarbon is used.

6. The improvement of claim 1 wherein about 1.5 to 6 weight percent, based on the alkenylbenzene, of the dihydroaromatic hydrocarbon is used.

7. In a process for the polymerization of a feed material consisting of styrene in the presence of an alfin polymerization catalyst consisting essentially of sodium isopropoxide, allyl sodium, and sodium chloride, the improvement which comprises regulating the molecular weight of the resultant polymer by (1) adding about 1 to 80 parts, based on the styrene, of 1,4-dihydrobenzene to an inert hydrocarbon diluent; (2) dissolving therein styrene; (3) adding thereto about 1 to 5 parts, based on the total sodium content, of an alfin catalyst prepared with finely-divided sodium having an average particle size of not more than about 2 microns; (4) maintaining the reaction temperature between about $-25°$ and $+40°$ C., whereby solid polystyrene of a controlled molecular weight is obtained; and (5) recovering said polystyrene.

References Cited by the Examiner

UNITED STATES PATENTS

| | | | |
|---|---|---|---|
| 2,841,574 | 7/1958 | Foster | 260—93.5 |
| 3,067,187 | 12/1962 | Greenberg et al. | 260—93.5 |

JOSEPH L. SCHOFER, *Primary Examiner.*

J. A. SEIDLECK, *Examiner.*